Patented Oct. 7, 1952

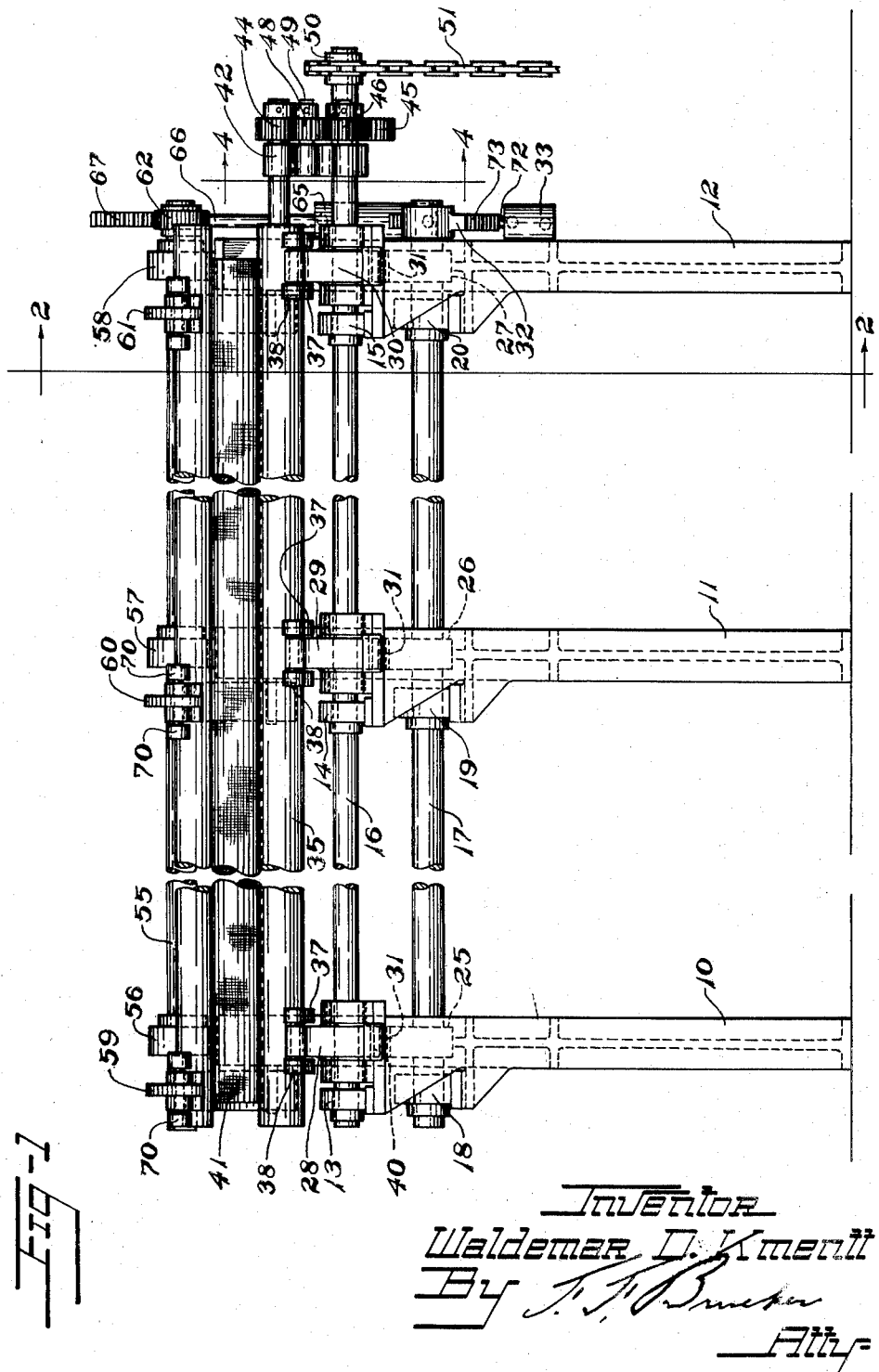

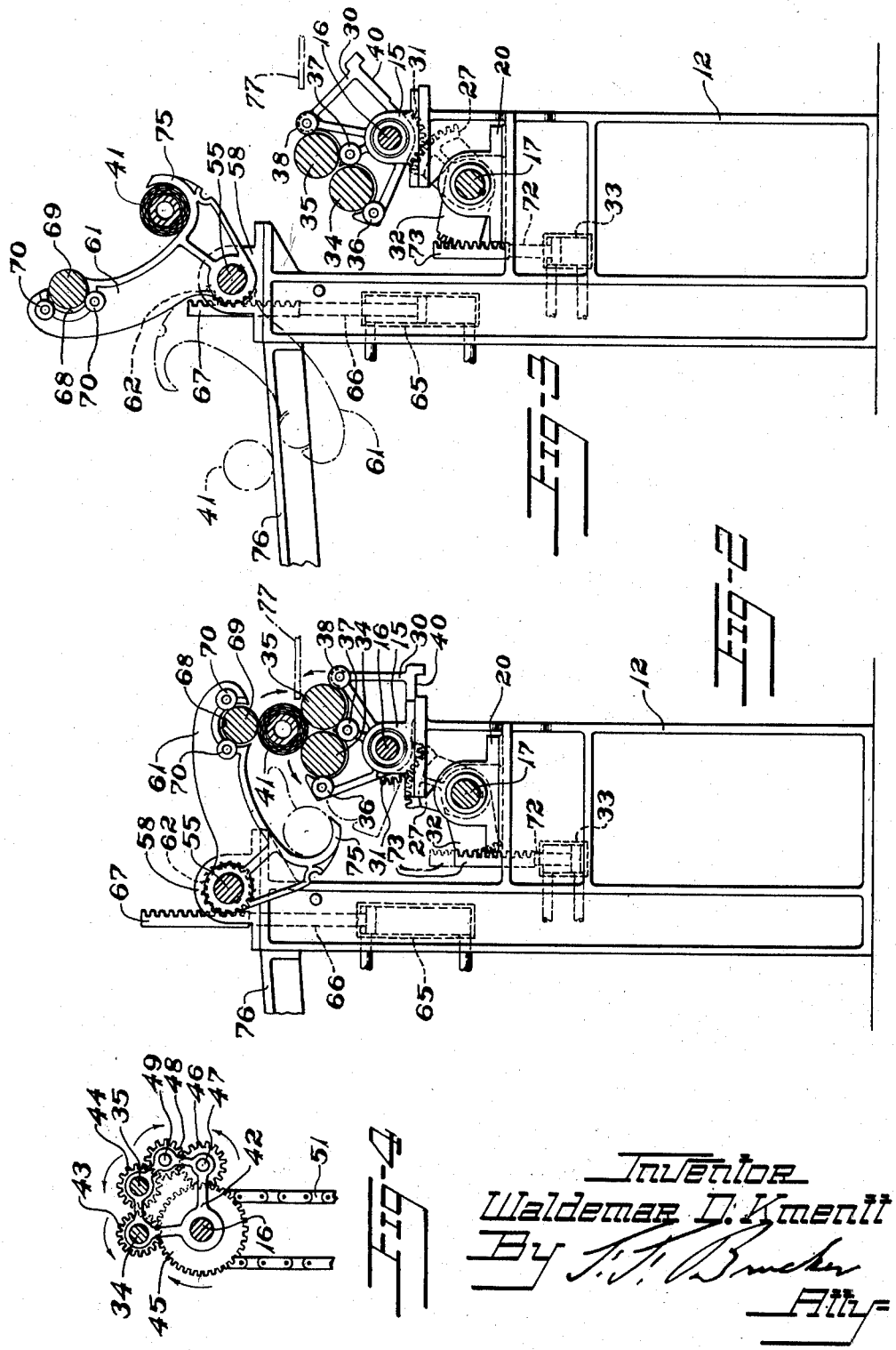

2,613,043

UNITED STATES PATENT OFFICE 2,613,043

APPARATUS FOR WINDING SHEET MATERIAL ABOUT CYLINDRICAL BODIES

Waldemar D. Kmentt, Akron, Ohio, assignor to The B. F. Goodrich Company, New York, N. Y., a corporation of New York Application April 21, 1948, Serial No. 22,423

4 Claims. (Cl. 242—66)

This invention relates to the winding of sheet material about cylindrical bodies and is especially useful in the manufacture of fabric reinforced rubber hose or similar articles or similar operations where adhesive sheet material is to be wound about an elongate mandrel or pole.

In the manufacture of rubber hose, where an elongate mandrel has been supported upon driven cradle rollers and pressure has been applied thereto by a superimposed pressure roller while adhesive sheet material has been fed between the mandrel and the supporting cradle rolls, difficulty has been encountered in handling the mandrels with the wrapped articles thereon because of the length and consequent weakness of the mandrels resulting in sagging and permanent bending of the mandrels where it has been attempted to lift them to and from the winding apparatus by their ends. Furthermore, attempts to handle the mandrels have resulted in damage to the hose.

It is an object of the present invention to avoid those difficulties by providing for support of the mandrels at positions throughout their lengths to avoid sagging.

Other objects are to provide for rapid discharge of the wrapped article from the wrapping apparatus, to provide for deposit of the article upon supporting runways, and to provide for lifting the articles to an elevated position for delivering to a position for further treatment.

These and other objects will appear from the following description, reference being had to the accompanying drawings which show an embodiment of the invention.

Of the drawings,

Fig. 1 is a front elevation of apparatus constructed in accordance with and embodying the invention, parts being broken away.

Fig. 2 is a cross-sectional view thereof taken on line 2—2 of Fig. 1, showing the article on the cradle rolls in winding position.

Fig. 3 is a similar view with the pressure roll in raised position and the article supported by the pressure arms, the dot and dash lines indicating the position of the arms in discharging the article to the runways.

Fig. 4 is a sectional view, taken on line 4—4 of Fig. 1 showing the mechanism for driving the cradle rolls.

Referring to the drawings, the numerals 10, 11, 12 designate similar vertical frame members arranged at spaced-apart intervals. The frame members are attached to the floor and held in spaced-apart relation by suitable tie rods (not shown). Arranged in aligned bearings 13, 14, 15, secured to frame members 10, 11, 12 is a rotatable shaft 16. A second shaft 17, parallel thereto, is rotatably supported on the frame members by bearings 18, 19, 20 thereon. Fixed to shaft 17 are series of segmental gears 25, 26, 27. Fan-shaped arms 28, 29, 30 are rotatably mounted upon shaft 16 and have segmental gear portions 31 meshing with gears 25, 26, 27. A pair of elongate cradle rolls 34, 35 are supported for rotation on the arms 28, 29, 30 as by anti-friction rollers 36, 37, 38 mounted thereon. Fixed to one end of shaft 17 adjacent the frame member 12 is a segmental gear 32. A double-acting fluid pressure cylinder 33 is secured to the frame member 12 and its piston rod 72, which extends vertically, has a rack 73 secured thereto and meshing with gear 32. The arrangement is such that when the rack 73 is in lowered position, the cradle rolls 34, 35 have their axes in a horizontal plane, as shown in Fig. 2, where they are in position to support and retain an elongate rotatable article 41, and in the raised position of the rack 73, the axes of cradle rolls 34, 35 are in an inclined plane, as shown in Fig. 3, such that the article will not be retained but will roll off of the cradle rolls.

The arms 28, 29, 30 have stop positions 40 which in the lowered position of rack 38 rest upon the frame members 10, 11, 12 respectively to level the cradle rolls 34, 35.

Provision is made for driving the cradle rolls 34, 35, and for this purpose a gear supporting member 42 (see Fig. 4) is pivotally mounted on shaft 16. The ends of cradle rolls 34, 35 are rotatably journaled in this member and have pinions 43, 44 fixed respectively to their ends. These gears clear each other. A gear 45 is fixed to shaft 16 and meshes with pinion 43. A similar pinion 46 meshes with gear 45 and is rotatably mounted about a stud 47 fixed to member 42. An idler gear 48 is rotatably mounted on a stud 49 fixed to members 42, and meshes with pinions 44, 46. The arrangement is such that cradle rolls 34, 35 are driven in the same direction by shaft 16 at any position of the cradle rolls. A sprocket 50 is secured to shaft 16 and engages a drive chain 51, driven from any suitable source of power (not shown).

Provision is made for holding the article against the cradle rolls, and for this purpose a shaft 55 is journaled in bearings 56, 57, 58 mounted on frame members 10, 11, 12 respectively. Arms 59, 60, 61 are fixed to shaft 55, which also has a pinion 62 secured thereto. A double-acting fluid pressure cylinder 65 is fixed vertically to frame member 12. Its piston rod 66 has a rack 67 secured thereto which meshes with pinion 62. The arrangement is such that when the rack 67 is raised, as shown in Fig. 2, the arms 59, 60, 61 are in substantially horizontal position, and where the rack 67 is lowered, as shown in Fig. 3, the arms are raised. The arms 59, 60, 61 are formed with notches 68 for retaining a pressure roller 69, anti-friction rollers 70 being provided for engaging the roller. The notches are so formed that the roller cannot drop from them but one face of the roller is exposed for pressing purposes.

The arms 59, 60, 61 are also formed with catching means such as the hooked extensions 75 having concave seats facing upwardly in the horizontal pressing position of the arms and located slightly below the top of the cradle rolls 34, 35 so that when arms 28, 29, 30 are rotated about shaft 16 in a counter-clockwise direction, as seen in Fig. 2 to the dot and dash line position, the article 41 will be deposited on the extensions 75, and upon rotation of arms 59, 60, 61 in a counter-clockwise direction, as seen in Fig. 3 the article will be deposited upon conveyor means such as inclined runways 76 attached to and extending away from the frame members 10, 11, 12, the final rotative position of arms 59, 60, 61 being shown in dot and dash lines in Fig. 3.

The article 41 rolls down the inclined runways to a position for performing another operation thereon. By lifting the article and depositing it on the inclined runway at a higher elevation than it assumed during the winding operation the article is transferred by gravity from the machine to the next operation without losing altitude, thereby keeping succeeding winding operations at the same attitude with respect to the operators.

In the operation of the apparatus, the arms 59, 60, 61 are raised and an elongate mandrel is laid upon the cradle rolls 34, 35, the rolls 34, 35 are rotated by the rotation of shaft 16, and the arms 59, 60, 61 are lowered to the position illustrated in Fig. 2. For this purpose fluid under pressure is admitted to the lower end of cylinder 65 through a suitable control valve. Sheet material is then fed over a table 77 and between the mandrel and cradle rolls where it is adhered to the mandrel and is wound thereabout raising the roll 69 as the article increases in diameter. When the article is completed, the operator adjusts a valve which controls cylinder 33 so as to cause fluid under pressure to enter the lower end of the cylinder, rotating the arms 28, 29, 30, in a counter-clockwise direction about shaft 16 and depositing the wound article and mandrel on the hooks 75. Thereafter the operator rotates arms 59, 60, 61 in a counter-clockwise direction about shaft 55 by admitting pressure fluid to the upper end of cylinder 65 and opening the lower end thereof to exhaust. Rotation of the arms deposits the article and its mandrel onto the inclined runways 76. The parts are then restored to their initial positions ready for the next operation.

While three of the frame members with their associated mechanism have been illustrated, it is to be understood that this mechanism may be duplicated for handling extremely long lengths of hose or other long articles requiring continuous support.

As the mandrels are supported at close intervals, sagging and bending of the mandrels is avoided and the operator is relieved from lifting of the heavy mandrels.

Variations may be made without departing from the scope of the invention as it is defined by the following claims.

I claim:

1. Apparatus for winding sheet material about a body, said apparatus comprising means for supporting the body and wrapping sheet material about it, means for pressing the body against said supporting means, a conveyor, and means on said pressing means comprising a receiving element movable simultaneous therewith for transferring the body from said supporting means to said conveyor.

2. Apparatus for winding sheet material about a body, said apparatus comprising a pair of driven cradle rolls for supporting and rotating the body about its axis, a pressure roll at said cradle rolls for retaining the body thereon, pivoted arms supporting said pressure roll, said arms having means thereon for catching and supporting a body discharged from said cradle rolls, said cradle rolls being moveable to a position to transfer the body to said catching means, means for so moving said cradle rolls, a conveyor, and means for moving said arms to transfer the body from said catching means to said conveyor.

3. Apparatus for winding sheet material about an elongate body, said apparatus comprising rotatable means for supporting said body and wrapping sheet material thereabout, movable means for pressing said body against said supporting means as the sheet material is wrapped thereabout, means for moving said pressing means toward and from said supporting means, means for tipping said supporting means to permit unloading of the wrapped body, and means on said pressing means comprising a receiving element movable therewith for receiving said body and lifting it from the supporting means to a position spaced therefrom.

4. Apparatus for winding sheet material about an elongate body, said apparatus comprising rotatable means for supporting said body and wrapping sheet material thereabout, article-receiving means adjacent said supporting means, means pivotally mounted for pressing said body against said supporting means to press the sheet material as it is wrapped thereabout, means for pivotally moving the pressing means toward and from said supporting means, means for tipping said supporting means to permit unloading of the wrapped body, and means on said pressing means comprising a holding element movable therewith in its pivotal movement for receiving said body and lifting it from the supporting means to said article-receiving means.

WALDEMAR D. KMENTT.

REFERENCES CITED

The following references are of record in the file of this patent:

UNITED STATES PATENTS

| Number | Name | Date |
| --- | --- | --- |
| 1,826,041 | Berry | Oct. 6, 1931 |
| 1,851,605 | Valentine et al. | Mar. 29, 1932 |
| 2,449,945 | Lewis | Sept. 21, 1948 |